United States Patent [19]

Nakashima et al.

[11] Patent Number: 5,005,134
[45] Date of Patent: Apr. 2, 1991

[54] NUMERICAL CONTROL APPARATUS WITH SIMULTANEOUS FUNCTION EXECUTION

[75] Inventors: Yoshihiro Nakashima, Machida; Yasunori Kinoshita, Kunitachi, both of Japan

[73] Assignee: Fanuc Ltd., Minamitsuru, Japan

[21] Appl. No.: 274,149

[22] PCT Filed: Apr. 26, 1988

[86] PCT No.: PCT/JP88/00409
§ 371 Date: Nov. 9, 1988
§ 102(e) Date: Nov. 9, 1988

[87] PCT Pub. No.: WO88/08559
PCT Pub. Date: Nov. 3, 1988

[30] Foreign Application Priority Data

Apr. 30, 1987 [JP] Japan .............................. 62-107257

[51] Int. Cl.⁵ .......................................... G05B 19/403
[52] U.S. Cl. ............................ 364/474.01; 364/474.11
[58] Field of Search ............... 364/147, 171, 900, 200, 364/168, 169, 170, 474.01, 167.01, 474.11

[56] References Cited

U.S. PATENT DOCUMENTS 4,090,120 5/1978 Leenhouts .
4,794,541 12/1988 Kiya .................................. 364/474.01
4,823,253 4/1989 Shima .............................. 364/474.01
4,829,419 5/1989 Hyatt ............................... 364/474.01

FOREIGN PATENT DOCUMENTS 2001783 9/1979 United Kingdom .

*Primary Examiner*—Allen R. MacDonald
*Attorney, Agent, or Firm*—Staas & Halsey

[57] ABSTRACT

A numerical control apparatus for sequentially controlling an NC machine tool in accordance with a stored-program method, in which a plurality of function codes of the same type are set from the same block of an NC program. These function instructions of the same type are executable simultaneously on the machine tool side. To this end, the apparatus includes a memory (101b) for simultaneously storing a plurality of auxiliary function codes, which command the machine tool to perform specific operations, from a program that has been read in a programmable machine controller (2) executes a function instruction upon identifying a number of each of the auxiliary function codes stored in the memory. A processor (101d) updates all of the auxiliary function codes of the memory in response to completion of a sequence operation, which corresponds to each of the auxiliary function codes, in the machine tool.

4 Claims, 4 Drawing Sheets

```
| M03    M10    M50    CR |   PROGRAM
```

| M03 ⟶ | 1ST M COMMAND |
|---|---|
| M10 ⟶ | 2ND M COMMAND |
| M50 ⟶ | 3RD M COMMAND |

PROCESSING ON NC SIDE

| 1ST M-CODE REGISTER | OUTPUT CODE FOR M3 |
|---|---|
| 2ND M-CODE REGISTER | OUTPUT CODE FOR M10 |
| 3RD M-CODE REGISTER | OUTPUT CODE FOR M50 |

| 1ST M-CODE READ-IN SIGNAL | MF1 |
|---|---|
| 2ND M-CODE READ-IN SIGNAL | MF2 |
| 3RD M-CODE READ-IN SIGNAL | MF3 |

NUMERICAL CONTROL APPARATUS WITH SIMULTANEOUS FUNCTION EXECUTION

NUMERICAL CONTROL APPARATUS

1. Technical Field

This invention relates to a numerical control apparatus for controlling the movable element of an NC machine tool.

2. Summary of the Invention

With a machine tool system ordinarily referred to as a "soft-wired" NC (numerical control apparatus), a controller equipped with a microprocessor has auxiliary control functions (PMC functions) for machining which include control for tool exchange, spindle rotational speed and workpiece exchange.

However, even if the machine tool side has a plurality of auxiliary functions, such as a function for forward rotation of a spindle and a function for controlling the supply of a machining fluid, the NC program read in from the controller cannot output codes specifying a plurality of auxiliary functions simultaneously. The reason for this is that an NC program expresses various operations of the machine tool in a specific format, the program data is successively decoded by the controller and only one M-function code designating an auxiliary function can be set from one simultaneously executable data block.

Accordingly, the arrangement is such that when it is desired to control the supply of machining fluid while rotating the spindle in the forward direction, by way of example, "M03", which is a function code for forward spindle rotation, and "M08", which is a function code for controlling the supply of machining fluid, are programmed in separate blocks, the spindle is controlled by designating M03 and, when the next block is executed, the supply of the machining fluid is controlled while the state of the spindle is maintained.

In general, however, when the operations of auxiliary functions are controlled by a sequence program, a sequence completion signal regarding each auxiliary function is transmitted to the NC side and only then is the next block executed. Consequently, with the conventional method of designating auxiliary functions desired to be executed simultaneously by division into two blocks, there is an increase in the exchange of completion signals between the controller and the machine tool in order to verify whether a commanded operation has actually commenced. This is an impediment when it is attempted to shorten the time needed to machine a workpiece by a machine tool controlled by an NC program. Accordingly, an arrangement is sometimes adopted in which a new M-function code for executing a plurality of auxiliary functions simultaneously is set and this code is read in from the NC command program block.

In order to set a new code, however, a sequence program for the corresponding sequence control must be prepared and, hence, the sequence program increases in length. Moreover, since there is no change in the number of executed auxiliary functions by virtue of this expedient, a problem is that storage area is substantially wasted.

DISCLOSURE OF THE INVENTION

The present invention has been devised to solve these problems and its object is to provide a numerical control apparatus in which a plurality of function codes of the same type are set from the same block of an NC program, and these function instructions of the same type are executable simultaneously on the machine tool side.

According to the present invention, there is provided a numerical control apparatus for sequentially controlling an NC machine tool in accordance with a stored-program method, comprising memory means for simultaneously storing a plurality of auxiliary function codes, which command the machine tool to perform specific operations, from a program that has been read in, execution means for executing a function instruction upon identifying a number of each of the auxiliary function codes stored in the memory means, and updating means for updating all of the auxiliary function codes of the memory means in response to completion of a sequence operation, which corresponds to each of the auxiliary function codes, in the machine tool, wherein a plurality of sequence programs for simultaneously commanding specific operations of the machine tool are run based on a plurality of function codes of the same type set in an NC program, the memory means storing the auxiliary function codes being updatable when a sequence operation is completed.

DETAILED DESCRIPTION OF THE PREFERRED EMBODIMENT

An embodiment of the present invention will now be described in detail with reference to the drawings.

Figure 1:
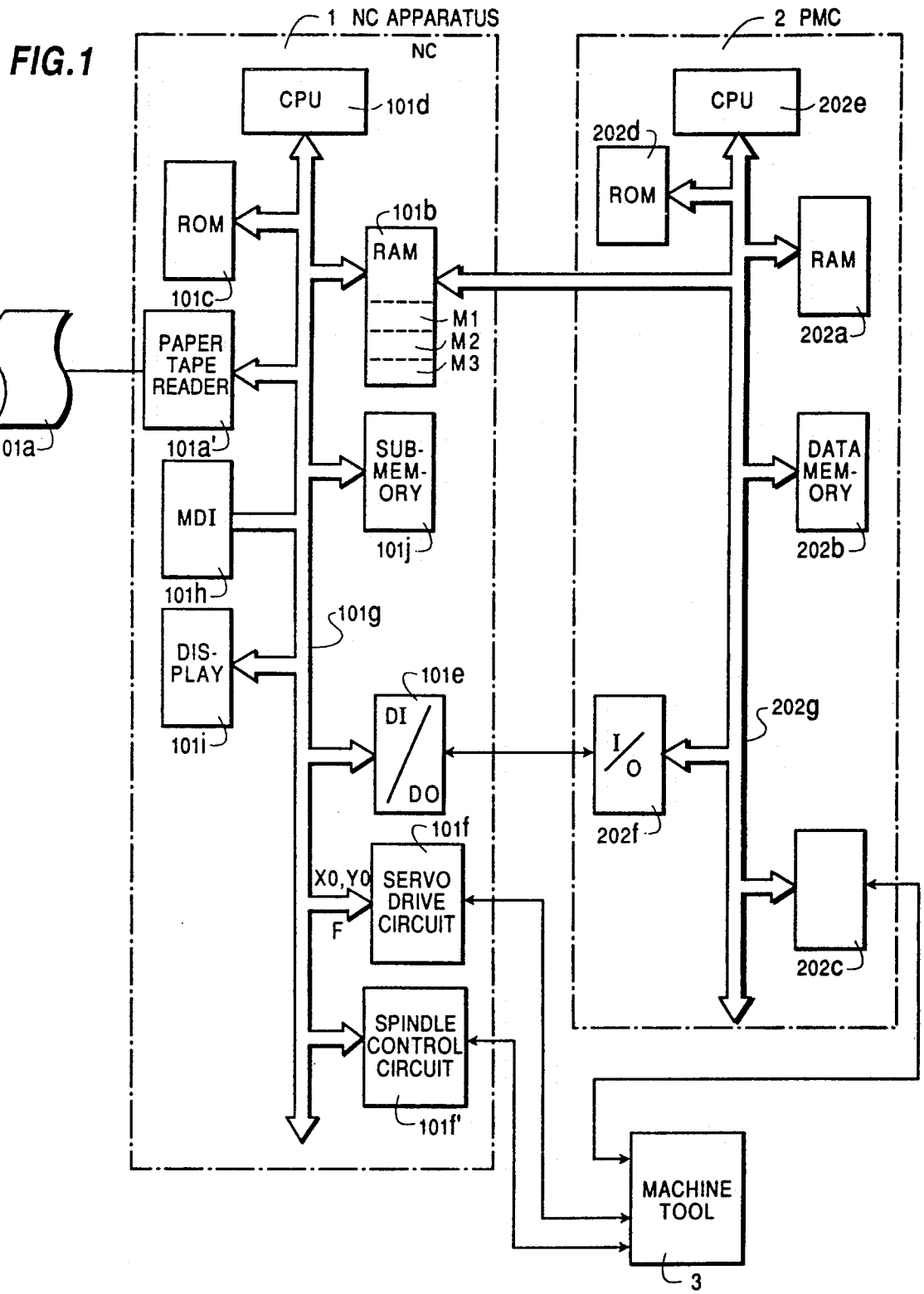
FIG. 1 is a block diagram of an embodiment for a case in which the numerical control apparatus (NC) of the present invention is used together with a programmable machine controller (PMC)

FIG. 1 is a block diagram of an embodiment for a case in which the numerical control apparatus (NC) of the present invention is used together with a programmable machine controller (PMC).

In the figure, numeral 1 denotes an NC apparatus, 2 a programmable machine controller (hereinafter referred to as a PMC) provided separately of the NC apparatus, and 3 a machine tool.

In the numerical control apparatus 1, numeral 101a denotes a paper tape in which machining commands are punched, 101a' a paper tape reader for reading the paper tape, and 101b a random-access memory (RAM) for storing the results of CPU processing, described below, as well as machine states and the machining commands punched in the machining tape, the RAM having a display area, described below. Numeral 101c denotes a read-only memory (ROM) which stores a basic control program for controlling the numerical control apparatus 1, 101d a processor (CPU) for executing processing conforming to each instruction of a machining command program or the basic command program, and 101e an input/output circuit (DI/DO circuit) for performing an exchange of control signals between the sequence controller 2 and the NC 1. Numeral 101f denotes a servo drive circuit which drives a servomotor for driving an element such as a table of the machine tool 3. This circuit includes a pulse distributing arithmetic circuit to which amounts of movement X0, Y0 along X and Y axes and a feed rate F are inputted, and which executes a well-known pulse distribution operation to output distributed pulses Xp, Yp. Numeral 101f' denotes a spindle control circuit for driving a spindle motor of the machine tool 3, and 101g an address/data bus line.

Numeral 101h denotes a manual data input unit (MDI) mounted on a control panel of the NC 1 and used to input one block of machining command data when adding or altering machining command data. Numeral 101i denotes a universal display unit for displaying, e.g., the present position of the tool or the like. It is permissible for the display unit 101h and the MDI 100i to be constructed as a single unit. Numeral 101j denotes a submemory constituted by a bubble memory and a C-MOS memory storing a control program, which is peculiar to the machine, for controlling turning machining, drilling and the like. The bus 101g interconnects the abovementioned components.

In the PMC 2, numeral 202a denotes a random-access memory (RAM) storing a sequence program. The sequence program is obtained by logically programming the functions of a magnetics circuit in the form of instruction codes. Numeral 202b denotes a data memory for storing the on/off states of the relays of the magnetics circuit in the form of "1"s or "0"s, in which each relay corresponds to one bit. For example, when an automatic mode is commanded from the control panel, a relay a(AUT) is turned on in a magnetics circuit. In the PMC 2, however, a "1" is stored in the 0-th bit at the 10 address of the data memory 202b. Numeral 202c denotes a data input unit for administering input and output of data with the machine tool 3, 202d a ROM for storing a control program which controls the sequence controller main body 2, 202e a processor (CPU) for executing predetermined sequence processing in accordance with the control program and a sequence program, 202f an input/output circuit for performing an exchange of control signals with the NC unit 1, and 202g an address/data bus line.

Figures 2, 3A, 3B, 6:
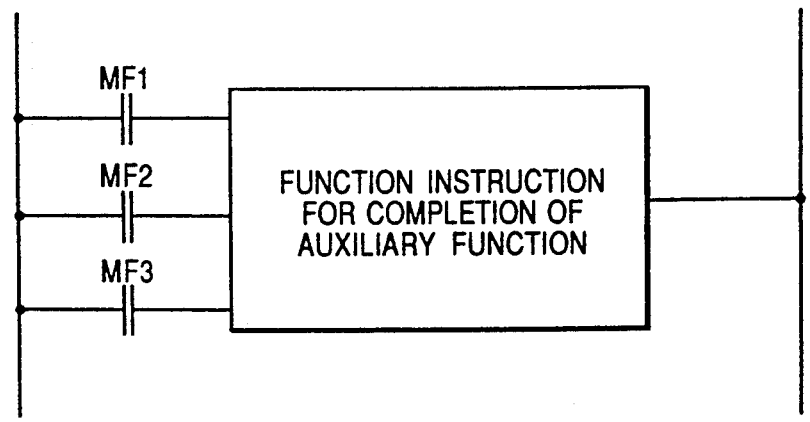
FIG. 2 is a diagram showing an example of a program, of one block read in on the NC apparatus side.
FIGS. 3(a) and (b) are diagrams showing examples of processing of M-code read-in signals on the NC side.
FIG. 6 is a diagram illustrating the correlation between a function instruction for auxiliary function completion and memory.

The operation of the numerical control apparatus of the present invention will not be described. In this example, assume that three types of auxiliary functions M3, M10 and M50 are to be implemented, as shown in FIG. 2. Also, assume that a program is set in which M3 is a first M command, M0 a second M command and M50 a third M command.

First to third M-code registers are provided on the side of the NC 1, as shown in FIG. 3(a), which outputs codes corresponding to M3, M10 and M50. First to third M-code read-in registers are provided on the side of the NC 1, and MF1, MF2, MF3 are set as M-code read-in signals.

Figure 4A:
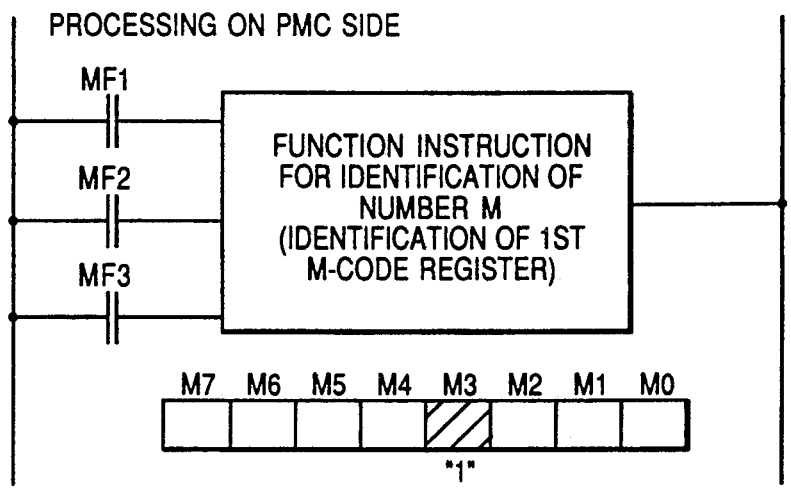
FIGS. 4(a), 4(b), and 4(c) are diagrams illustrating the correlation between function instructions and memory on the side of a PMC 2.
Figure 4B:
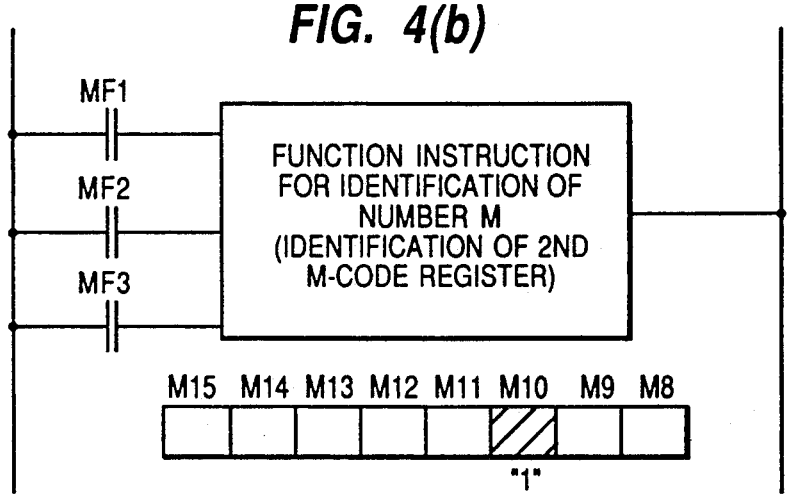
Figure 4C:
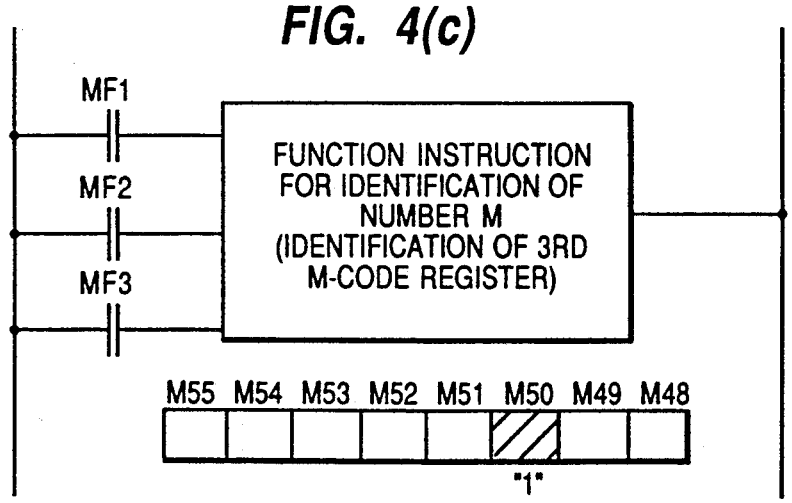

As shown in FIGS. 4(a)–(c), arithmetic instructions (function instructions) for identifying a plurality, e.g., three in this example, of auxiliary function numbers (M numbers) are provided on the side of the PMC 2, and the results of processing are set in the data memory 202b. In FIG. 4(a), the first M-code register (M3) corresponding to a control signal MF1 is identified, and the bit of the corresponding address in the memory 202b is set to "1". Similarly, in FIG. 4(b), the second M-code register (M10) corresponding to a control signal MF2 is identified, and in FIG. 4(c), the third M-code register (M50) corresponding to a control signal MF3 is identified The corresponding bits in the memory 202b are set to "1".

Figures 5, 7:
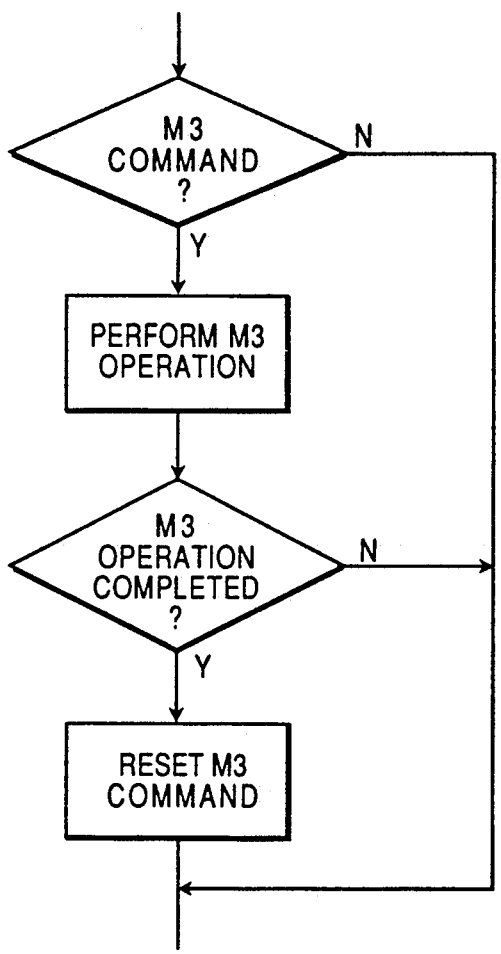
FIG. 5 is a flowchart illustrating an auxiliary function processing procedure.
FIG. 7 is a diagram illustrating an example of the arrangement of a PMC memory.

Next, when a processing operation relating to each auxiliary function regarding the aforesaid processing results is performed by the sequence program and each of the processing operations is completed, the results of processing in the memory 202b are reset. FIG. 5 is a flowchart illustrating the processing procedure of the auxiliary function M3. Processing based on similar flowcharts is executed for each of the auxiliary functions M10 and M50 as well.

At the end of the sequence program, a function instruction for auxiliary function completion of the kind shown in FIG. 6 is prepared. When all corresponding bits for the commanded function instructions are "0", a completion signal is delivered to the side of the NC 1.

FIG. 7 illustrates an example of the arrangement of the PMC memory. The M commands of the auxiliary functions can be formed in advance as a table in which the commands are shown corresponding to each address and bit.

Though an embodiment of the present invention has been described, the invention is not limited thereto and can be modified in a variety of ways without departing from the scope of the claims.

The numerical control apparatus of the present invention makes simultaneous execution possible on the machine tool side even when a plurality of function codes of the same type are set in the same block of an NC program. As a result, it is unnecessary to increase the size of a sequence program a'd it is possible to utilize memory efficiently.

What is claimed is:

1. A numerical control apparatus for sequentially controlling an NC machine tool in accordance with a stored-program method by using a sequence program and a program that has been read in, comprising:
    memory means for simultaneously storing a plurality of auxiliary function codes which command the NC machine tool to perform specific auxiliary functions, from the program that has been read in;
    execution means for simultaneously executing function instructions identifying auxiliary function numbers corresponding to each of the auxiliary function codes stored in said memory means to carry out the auxiliary functions; and
    updating means for updating all of the auxiliary function codes of said memory means in response to completion of the auxiliary functions, which correspond to each of the auxiliary function codes, in the NC machine tool.

2. A numerical control apparatus according to claim 1, wherein said numerical control apparatus includes a main body and a programmable machine controller coupled to the main body, wherein said memory means is provided on the side of the main body of said numerical control apparatus, and further comprising auxiliary function read-in registers provided for reading in the plurality of auxiliary function codes simultaneously on the side of said programmable machine controller.

3. A numerical control apparatus according to claim 1, wherein said execution means processes a function instruction in accordance with set control conditions upon decoding each auxiliary function code.

4. A numerical control apparatus according to claim 1, wherein the plurality of auxiliary function codes stored by said memory means are included in the same program block, and a transition to execution of the next program block is made after confirmation of a signal indicating completion of a sequence operation by the NC machine tool.

* * * * *

UNITED STATES PATENT AND TRADEMARK OFFICE
CERTIFICATE OF CORRECTION

PATENT NO. : 5,005,134
DATED : APRIL 2, 1991
INVENTOR(S) : YOSHIHIRO NAKASHIMA ET AL.

It is certified that error appears in the above-identified patent and that said Letters Patent is hereby corrected as shown below:

Title Page, [57] ABSTRACT,
 line 12, "in a programmable" should be --in. A programmable--.

Col. 1, line 5, "NUMERICAL CONTROL APPARATUS" should be --BACKGROUND OF THE INVENTION--;

line 10, "Summary of the Invention" should be --Background Art--;

line 64, "DISCLOSURE OF THE INVENTION" should be --SUMMARY OF THE INVENTION--.

Signed and Sealed this

Twenty-second Day of September, 1992

Attest:

DOUGLAS B. COMER

*Attesting Officer*     *Acting Commissioner of Patents and Trademarks*